US008669752B2

(12) United States Patent
Schindler

(10) Patent No.: US 8,669,752 B2
(45) Date of Patent: Mar. 11, 2014

(54) CONTROLLING RESISTANCE FOR INLINE POWER POWERED DEVICE DETECTION

(75) Inventor: Frederick Roland Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 322 days.

(21) Appl. No.: 13/173,514

(22) Filed: Jun. 30, 2011

(65) Prior Publication Data

US 2012/0212209 A1 Aug. 23, 2012

Related U.S. Application Data

(60) Provisional application No. 61/445,422, filed on Feb. 22, 2011.

(51) Int. Cl.
*G05F 5/08* (2006.01)
*G05F 1/56* (2006.01)

(52) U.S. Cl.
USPC ............................ 323/303; 323/274; 323/349

(58) Field of Classification Search
USPC ................. 323/273, 274, 279, 311, 303, 349
See application file for complete search history.

(56) References Cited

U.S. PATENT DOCUMENTS

| | | | | |
|---|---|---|---|---|
| 3,679,961 A | * | 7/1972 | Hamilton | 323/274 |
| 5,563,500 A | * | 10/1996 | Muterspaugh | 323/282 |
| 6,169,391 B1 | * | 1/2001 | Lei | 323/266 |
| 7,921,307 B2 | | 4/2011 | Karam et al. | |
| 7,921,314 B2 | | 4/2011 | Schindler et al. | |
| 7,930,568 B2 | | 4/2011 | Schindler | |
| 8,049,484 B2 | * | 11/2011 | Vetteth | 323/355 |
| 8,300,666 B2 | * | 10/2012 | Karam et al. | 370/496 |
| 2009/0088908 A1 | * | 4/2009 | Karam | 700/297 |

* cited by examiner

*Primary Examiner* — Gary L Laxton
(74) *Attorney, Agent, or Firm* — Edell, Shapiro & Finnan, LLC

(57) ABSTRACT

An apparatus and method are provided for controlling circuit resistance values used for detection of a device in an inline powered system. The system comprises a source device, either a current source or a voltage source, associated with an inline power device. The system also comprises a resistance control circuit comprising a transistor having an emitter, a base and a collector, and a first resistor coupled between the emitter and the collector. In response to the resistance control circuit receiving a relatively low current from the source device, the transistor is configured to be in an off state so that current from the source device flows through the first resistor have a value selected in order to maintain a sufficient resistance during an inline power device detection mode.

20 Claims, 4 Drawing Sheets

CONTROLLING RESISTANCE FOR INLINE POWER POWERED DEVICE DETECTION

CROSS REFERENCE TO RELATED APPLICATION

This application claims priority to U.S. Provisional Application No. 61/445,422, filed Feb. 22, 2011, the entirety of which is incorporated herein by reference.

TECHNICAL FIELD

The present disclosure relates to inline power devices and systems.

BACKGROUND

Powered devices (PDs) operating under the Institute of Electrical and Electronic Engineers (IEEE) inline power standards, e.g., the IEEE 802.3 standard, are attractive to customers for their electrical power saving capabilities. One method to make a PD more efficient involves using Schottky diodes rather than silicon diodes. PD circuits on the same power path can be made more reliable by adding circuit protection devices. These approaches, however, can lead to errors in inline PD detection techniques due to potential increased leakage current resulting from use of Schottky diodes. Additionally, systems that use these approaches tend to fail PD detection at high temperatures.

DESCRIPTION OF EXAMPLE EMBODIMENTS

Overview

An apparatus and method are provided for controlling circuit resistance values used for detection of a device in an inline powered system. A resistance control circuit is provided comprising a transistor having an emitter, a base and a collector, and a first resistor coupled between the emitter and the collector. The first resistor has a value selected to maintain a sufficient resistance during an inline power detection mode when the resistance control circuit receives a relatively low current from the source device, causing the transistor to be in an off state so that current from a source device flows through the first resistor.

Example Embodiments

Figure 1:
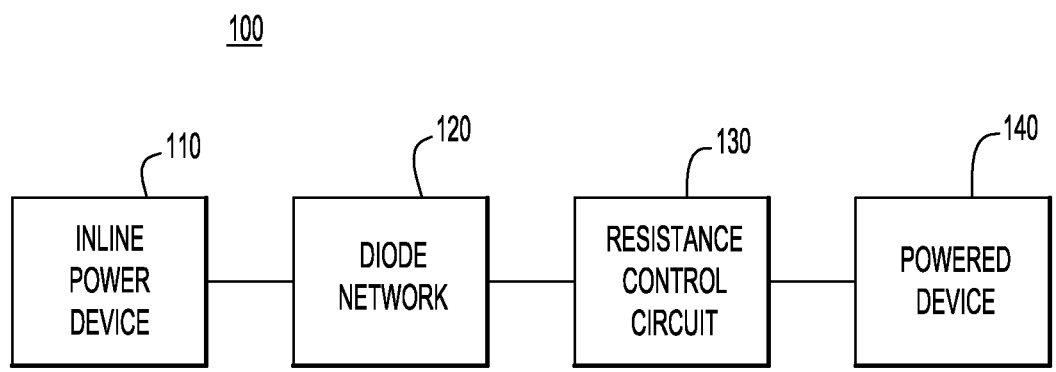
FIG. 1 is a block diagram that shows an example system topology of an inline power device and diode network and a resistance control circuit configured to control circuit resistance to make powered device detection more reliable.
Figure 2:
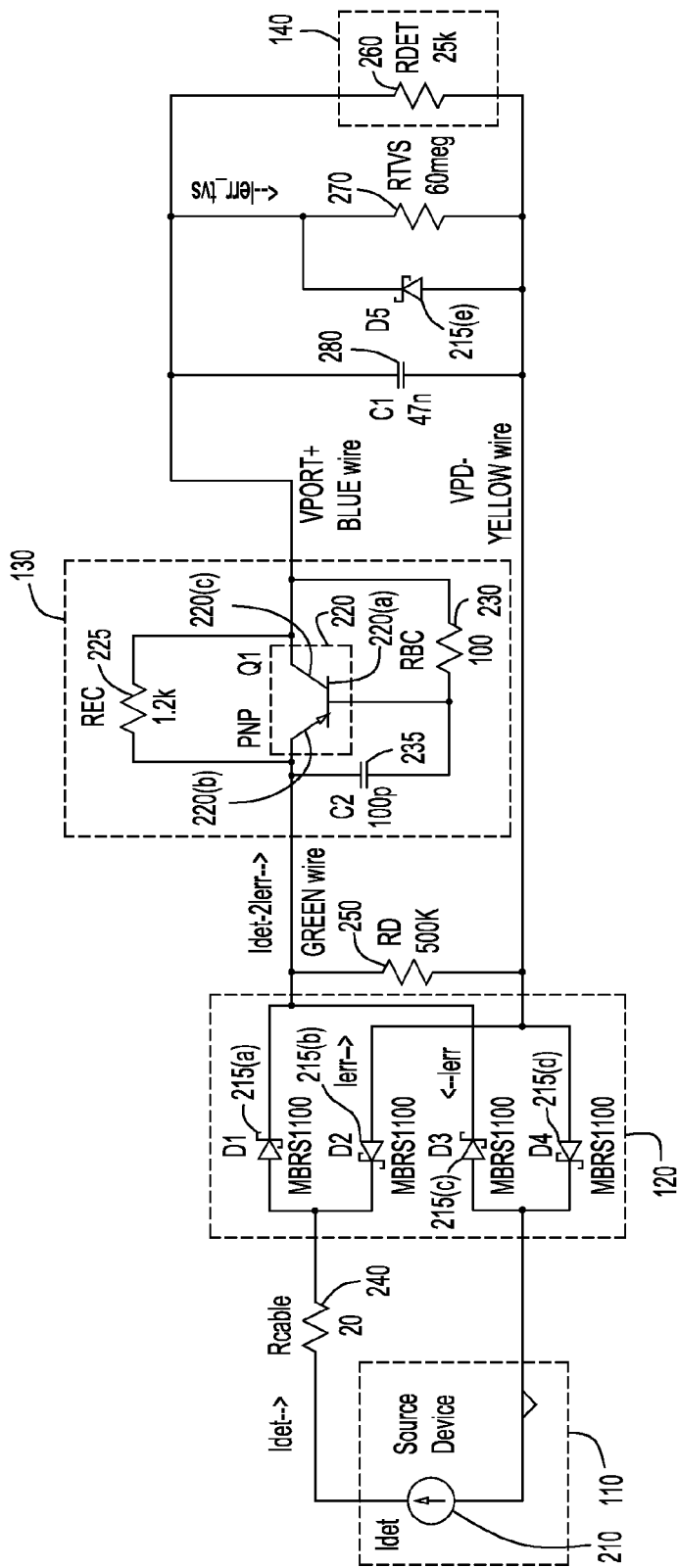
FIG. 2 is an example schematic circuit diagram showing electrical components of the system topology of FIG. 1.

FIG. 1 shows an example system topology 100 comprising an inline power device 110, a diode network 120, a resistance control circuit 130 and a powered device 140. The inline power device 110 is configured to provide power to the diode network 120, resistance control circuit 130 and powered device 140, as described herein. The inline power device 110 may be a Power over Ethernet (PoE) device or a power sourcing equipment device (PSE), e.g., an Ethernet switch, that when added to a network device, allows the network device to provide power to the powered device (PD) 140 through an Ethernet cable. It should be appreciated, however, that the inline power device 110 may be any power device configured to enable a network device to provide power to the powered device 140. The inline power device 110 is coupled to the diode network 120. The diode network 120 may operate as a full-wave rectifier and may be a network of any number of semiconductor diodes, for example, a network of silicon diodes, a network of Schottky diodes, or any combination thereof. In another example, the diode network may be a network of any number of synchronous rectifiers which would create near ideal diodes using metal oxide semiconductor field effect transistors (MOSFETs). For simplicity, the diode network 120 is shown in FIG. 2 as a network of Schottky diodes.

Diode network 120 is also coupled to the resistance control circuit 130. The resistance control circuit 130, as described herein, is configured to receive current from the inline power device 110 across the diode network 120 and is configured to maintain the resistance (or more generally impedance) of system 100 within an allowable or desirable resistance range. Additionally, the resistance control circuit 130, as described herein, is configured to maintain a voltage within a range expected by the powered device 140 for IEEE 802.3 device classification. In one example, the operating ranges for the voltage is covered in IEEE 802.3, Table 33-17-2. For example, a valid classification event voltage range may extend from approximately 14.5 volts to 20.5 volts. The resistance control circuit 130 is coupled to the powered device 140. The powered device 140 may be in any device (e.g., router, switch, hub, repeater, bridge, base station, computer, wireless access point, Internet Protocol (IP) phone, teleconference equipment, mobile device, etc.) that is configured to interface with a network and to receive power from the inline power device 110.

In general, the inline power device 110 provides sufficient power to the powered device 140 during a "power-on mode", via the diode network 120 and the resistance control circuit 130, to operate the powered device 140. In addition to providing power to the powered device 140, the inline power device 110 is configured to detect the presence of the powered device 140 during a so-called "detection mode" and to classify the type of powered device 140 that it detects during a so-called "classification mode". The terms "power-on" mode, "detection mode" and "classification mode" are terms used in accordance with the IEEE 803.2 standard, as an example.

During the detection mode, the inline power device 110 transmits an electrical signal for detection (e.g., a signal with relatively low current levels) to determine whether the link between the inline power device 110 and the powered device 140 is active. When the powered device 140 is detected, the inline power device 110 will enter the classification and power-on modes to provide power to the powered device 140. During the classification and power-on modes, the inline power device 110 will transmit an electrical signal at relatively high current levels to classify and power-on the powered device 140.

Reference is now made to FIG. 2. FIG. 2 shows an example schematic circuit diagram showing the electrical components of system 100. The schematic circuit diagram of FIG. 2 shows the diode network 120, the resistance control circuit 130 and a source device 210 (e.g., a current source device or a voltage source device) associated with the inline power device 110.

The diode network 120 comprises a plurality of diodes (e.g., Schottky diodes) shown at reference numerals 215(*a*)-215(*d*). There is also a diode outside of the diode network 120, shown at reference numeral 215(*e*). The resistance control circuit 130 comprises a transistor 220 having a base 220(*a*), emitter 220(*b*) and collector 220(*c*). The transistor 220 may be any type of semiconductor transistor, for example, a bipolar junction transistor (BJT), a MOSFET, etc. For simplicity, transistor 220 is shown as a "pnp" doped BJT transistor, though, it should be appreciated that transistor 220 may be a transistor of other doping types (e.g., an "npn" doped transistor). The resistance control circuit 130 also comprises a first resistor 225, a second resistor 230 and a capacitor 235. There are also a plurality of resistors shown at reference numerals 240, 250, 260 and 270, and a capacitor 280. It should be appreciated that the resistors 240 and 250 shown in the schematic circuit diagram of system 100 are not physical resistor devices, but rather, are used to represent electrical properties (e.g., resistance) of the circuit during the operations described herein.

In general, source device 210, associated with the inline power device 110, is configured to provide an appropriate electrical signal to operate in each of the detection mode, classification mode and power-on mode. For simplicity, the electrical signal is described as an electrical current originating from source device 210. The current from the source device 210 travels across a cable or electrical interconnect to the plurality of diodes 215(*a*)-215(*d*) in the diode network 120. Resistance 240 represents the electrical resistance of the cable/electrical interconnect between the source device 210 and the diode network 120, on which the current travels. As the current travels through the diode network 120, the current experiences leakage, resulting, for example, from increased temperature associated with the diodes 215(*a*)-215(*d*). Thus, due to the leakage current, the level of the current is reduced and, the current that ultimately reaches power device 140 is at a lower current level than the original level produced by the source device 210.

After traversing the diode network 120, the current travels to the resistance control circuit 130. The current will take a particular path within the resistance control circuit 130, depending on the current level of the current, as describe below in connection with FIG. 3. After passing through the resistance control circuit 130, the current reaches the powered device 140. Resistance 260 represents the resistance of the powered device 140 (e.g., the total resistance of a circuit of the powered device 140).

As explained above, the source device 210 of the inline power device 110 is configured to transmit electrical signals to the powered device 140 at varying current levels based on whether the inline power device 110 is operating in a detection mode, classification mode, or power-on mode. The source device 210 transmits currents at lower relative current levels when the inline power device 110 operates in the detection mode. The source device 210 outputs a current at higher relative current levels when the inline power device 110 operates in the classification mode and the power-on modes.

Figure 3:
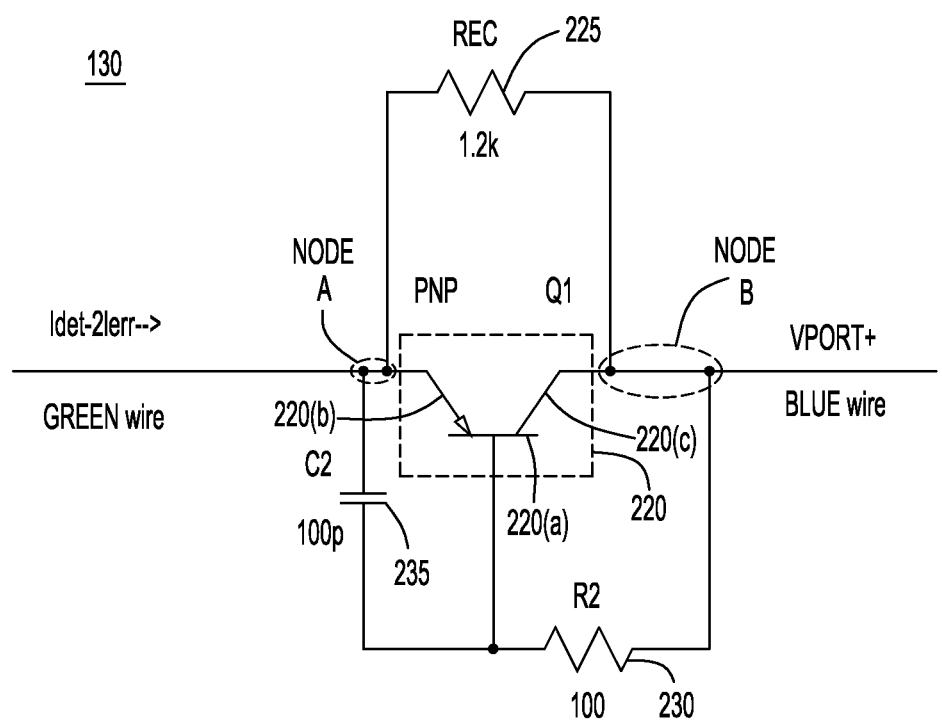
FIG. 3 is an example schematic circuit diagram of the resistance control circuit.

Reference is now made to FIG. 3 for an explanation of how the current traverses the resistance control network 130 based on the level of the current. In FIG. 3, current enters the resistance control network 130 at node A and exits the resistance control network 130 at node B. When the inline power device 110 is operating in a detection mode, the current from the source device 210 is at a relatively low level. Accordingly, at these relatively low levels, the transistor 220 is in an "off" state and operates as a high resistance (or high impedance in the frequency domain) device, e.g., an open circuit, from the perspective of the current, and thus the current travels to node B through resistor 225 instead of through transistor 220. Resistor 225 is a correction resistor which may be set to a value to adjust or correct for the different leakage current levels associated with the diodes 215(*a*)-215(*e*) in diode network 120. The value of the resistor 225 is set to restore the dynamic resistance that the inline power device 110 measures to a value, which, for example, may be a resistance value in the middle of an allowable or desirable range for the detection mode. Error components that vary with the signals (e.g., voltage or currents) produced by source device 210 may cause measurement errors. When the inline power device 110 operates in the detection mode, the error components that are constant cancel out. Resistor 225 operates to correct for errors due to leakage current associated with the diode network 120 (and the associated resistance of the diode network, represented by resistor 250 shown in FIG. 2) and for errors due to the leakage current of diode 215(*e*) represented by resistor 270 shown in FIG. 2. In short, the resistance value of resistor 225 adjusts for detection errors caused by leakage current within the system 100, and maintains the resistance within an allowable or desirable resistance range during an inline power device detection mode.

In one example, IEEE 802.3, Table 33-34 defines values for detection currents and classification currents. Detection currents may be near 260 µA, while classification currents may range from 9 mA to 44 mA. In general, relatively "low" currents are in the µA range and relatively "high" currents are in the mA range. In one example, the highest detection currents would be around 430 µA.

It should be appreciated that other components along the current path between the inline power device 110 and the powered device 140, and within the powered device 140, can be adjusted using this approach.

When the inline power device 110 operates in a classification or power-on mode, the current from the source device 210 is at a relatively high current level. At a higher level, the voltage drop across resistor 225 increases, and as a result, the transistor 220 "turns on." When the transistor 220 turns on, the transistor 220 operates as a low resistance device, e.g., a short circuit, and thus the current travels to node B through the transistor 220 instead of through resistor 225. In this case, most of the current passes through the emitter 220(*b*) to the collector 220(*c*) of the transistor 220, and as a result, the voltage drop across the emitter 220(*b*) and the collector 220(*c*) is sufficient to maintain the transistor 220 in an "on" state and to power the powered device 140. Additionally, when the transistor 220 is "on," a small amount of current travels through resistor 230. In other words, at relatively low current levels, the transistor is "off" and operates as an open circuit, and at relatively higher levels, the transistor 220 is "on" and operates as a short circuit. Thus, at the relatively high current levels, the powered device 140 is powered on by the current using a path that does not include the resistor 225. In general, the transistor 220 operates as a means for receiving current from the source device 210 associated with the inline power device 110 and as a means for passing the current through the resistor 225 that has a value configured to maintain a resistance during the inline power device detection mode when the current is at a relatively low level and for passing the current to the powered device 140 when the current is at a relatively high level. The transistor is configured to be in an off state to maintain the resistance within a resistance range suitable for the inline power device detection mode. It should be appreciated, however, that other devices can be utilized to perform the means for receiving current from the source device 210 and the means for passing the current through the resistor 225 and the powered device 140.

Resistor 230 and capacitor 235 in the resistance control circuit 130 operate to make the resistance control circuit 130 better tolerate electrical transient signals (e.g., transient voltage or current signals). For example, resistor 230 provides a path for the base current of the transistor, thus allowing the transistor 220 to turn on at sufficiently high current levels.

Figure 4:
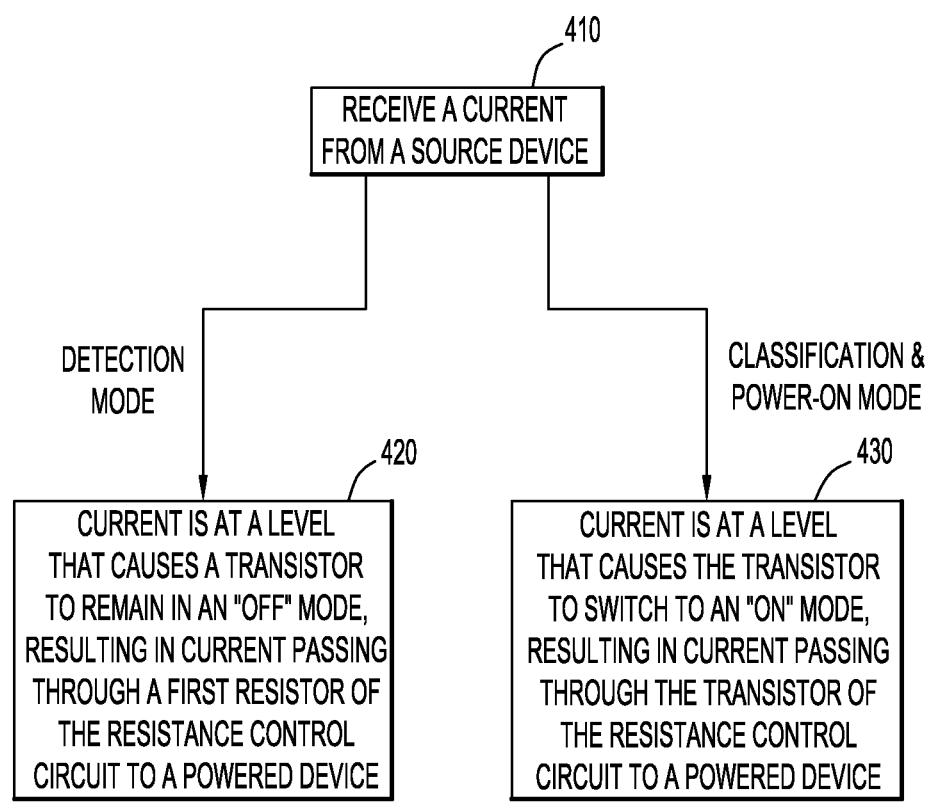
FIG. 4 is a flow diagram depicting examples of operations of the resistance control circuit in a detection mode, a classification and a power-on mode.

Reference is now made to FIG. 4. FIG. 4 shows a flow diagram that depicts operations of the resistance control circuit 130. At 410, the resistance control circuit 130 receives a current from the source device 210 associated with the inline power device 110. If the inline power device 110 is operating in the detection mode (e.g., if the current is at a relatively low level), at 420, the low current level causes the transistor 220 to remain in an "off" state, resulting in the current passing through a first resistor (e.g., resistor 225) of the resistance control circuit 130 to the powered device 140, where the first resistor is set to a value to maintain a desirable detection resistance. If the inline power device 110 is operating in the classification mode or power-on mode (e.g., if the current is at a relatively high level), at 430, the high current level causes the transistor 220 to switch to an "on" state, resulting in the current passing through the transistor 220 of the resistance control circuit 130 to supply power to the powered device 140.

Power device controllers may use the techniques described above for the inline power device 110 for detection, classification, and under-voltage detection of powered device 140. The above techniques result in more reliable operations for inline power system 100 and also allow for protection circuits to be added that make the system 100 more tolerant of electrical noise and transients.

The following provides an example of a correction resistance calculation to determine an appropriate resistance value for resistor 225 to act as a correction resistor in the detection mode, as described above. The example is described with reference to FIG. 2, and for simplicity the various circuit components are referred to by their labels rather than their reference numerals.

Idet is the current provided by the source device (Idet=IDET). Many source devices provide two currents, IDET1 and IDET2, and measure the voltages produced. The dynamic resistance is the ratio of the voltage difference over the current difference. For example, the IEEE standard 802.3, 33.2.5 specifies this resistance for the source device and inline power device, and 802.3, 33.3.4 provides specifications for the powered device.

Diodes D1-D4 ensure the voltage polarity provided by the source device providing IDET is correct on the powered device circuit, represented by RDET.

Diode D5, is a transient voltage suppressor (TVS) that clamps voltage transients to prevent damage to the powered device circuits.

When the source device provides current IDET, the polarity used forward biases diodes D1 and D4, and reverse biases diodes D2, D3 and D5. IERR is the leakage current through diodes D2 and D3. For an ideal diode, IERR is 0. The leakage current reduces the current that flows to the powered device. Rather than current IDET flowing to the powered device, the current is now IDET−2IERR.

Diode D5 also leaks current, denoted IERR_TVS. This leakage current also reduces the current that flows to the powered device (modeled by RDET). Thus, the current that actually flows to the powered device is IDET−2IERR−IERR_TVS.

The current errors can be modeled by two components: a constant current independent of the reverse bias, and a resistance component. Many inline power devices force two currents IDET1 and IDET2 to create two voltages VDET1 and VDET2. VD is the diode voltage drop of D1 and D4. The voltage produced by the resistor RDET is:

$$VDET1 = 2VD + R1 \times (IDET1 - 2IERR - IERR\_TVS)$$

$$VDET2 = 2VD + R1 \times (IDET2 - 2IERR - IERR\_TVS)$$

The constant part of the error components cancel out:

$$VDET1 - VDET2 = R1 \times (IDET - IDET2)$$

Superposition allows voltage sources to be replaced with short circuits, and current sources are replaced with open circuits, for purposes of circuit analysis. The dynamic resistance that the source device measures is: RD//(REC+RTVS//RDET). The symbol // means two resistances are in parallel.

An ideal value for RDET can be created by selecting an appropriate value for REC according to the equation: RDET=RD//(REC+RTVS//RDET). This equation can be solved for REC (correction resistance), which is the value to correct for the error (caused by leakage current), using the following formula:

$$R_{EC} = \frac{R_D}{R_D \frac{R_{DET} + R_{TVS}}{R_{DET} R_{TVS}} - 1} - R_{DET}$$

A commonly used Schottky diode has a resistance of 1 MΩ and two in parallel have a resistance (RD) value of 500 kΩ. In one example, a range for $R_{DET}$ is between about 23.7 to 26.3 kΩ. An ideal value for a system with symmetric tolerance is mid-range or 25 k-ohms. The circuit and techniques described herein permits a system design to increase the detection resistance to the ideal value at a desired operating point. RTVS has a high resistance value, typically around 60 MΩ and RDET is typically around 25 kΩ. Using these values:

$$R_{EC} = \frac{500}{500 \frac{25 + 60000}{25 \times 60000} - 1} - 25 = 1.3 k\Omega.$$

Thus, a value selected for resistor REC, using common values for other components, is 1.3 kΩ. This is an example of a value that will achieve the desired resistance (for purposes of detecting an inline powered device) despite the leakage currents associated with the diode network.

In sum, a system is provided comprising at least one of a current source and a voltage source associated with an inline power device, and a resistance control circuit comprising a transistor having an emitter, a base and a collector. A first resistor is coupled between the emitter and the collector. The first resistor has a value selected to maintain a sufficient resistance during an inline power device detection mode when the resistance control circuit receives a relatively low current from the source device causing the transistor to be in an off state so that current from the source device flows through the first resistor.

In addition, a method is provided comprising: receiving a current from a source device associated with an inline power device; when the current is at a relatively low current level, maintaining a transistor in an off state and passing the current through a resistor that has a value selected to maintain a sufficient resistance during an inline power device detection mode; and when the current is at a relatively high current level, switching the transistor to an on state and passing the current through the transistor to a powered device.

The above description is intended by way of example only. Various modifications and structural changes may be made therein without departing from the scope of the concepts described herein and within the scope and range of equivalents of the claims.

What is claimed is:

1. A system comprising:
   a source device comprising at least one of a current source and a voltage source associated with an inline power device; and
   a resistance control circuit comprising a transistor having an emitter, a base and a collector, and a first resistor coupled between the emitter and the collector;
   wherein the first resistor has a value selected to maintain a sufficient resistance during an inline power device detection mode during which the inline power device is configured to detect a presence of a powered device by transmitting an electrical signal to determine whether a link between the inline power device and the powered device is active, such that when the resistance control circuit receives a relatively low current from the source device causing the transistor to be in an off state, current from the source device flows through the first resistor to correct for leakage caused by the current flowing through a diode network before reaching the resistance control circuit.

2. The system of claim 1, wherein the resistance control circuit further comprises a capacitor coupled between the emitter and the base and a second resistor coupled between the base and the collector of the transistor.

3. The system of claim 1, wherein in response to receiving a relatively high current from the source device, the transistor is configured to be in an on state to pass current to the powered device during an inline power device classification mode.

4. The system of claim 3, wherein when the transistor is configured to be in the on state, current from the source device bypasses the first resistor to the powered device.

5. The system of claim 4, wherein the transistor is configured to supply current from the source device to power on the powered device.

6. The system of claim 3, wherein during the inline power device classification mode, the transistor is configured to maintain a voltage within a range expected by the powered device during the inline power device classification mode.

7. The system of claim 1, further comprising one or more diodes coupled to the source device and the resistance control circuit.

8. The system of claim 7, wherein the one or more diode devices comprises Schottky diodes.

9. The system of claim 1, wherein the source device is in a power source equipment device that is configured to supply power through an Ethernet cable.

10. A method comprising:
   receiving current from a source device associated with an inline power device;
   when the current is at a relatively low level, maintaining a transistor in an off state and passing the current through a resistor to correct for leakage caused by the current flowing through a diode network before passing through the resistor, wherein the resistor has a value configured to maintain a sufficient resistance during an inline power device detection mode during which the inline power device is configured to detect a presence of a powered device by transmitting an electrical signal to determine whether a link between the inline power device and the powered device is active; and
   when the current is at a relatively high level, switching the transistor to an on state and passing the current through the transistor to the powered device.

11. The method of claim 10, wherein passing the current through the resistor comprises passing the current through the resistor so as to produce a resistance within a resistance range suitable for the inline power device detection mode.

12. The method of claim 10, wherein switching the transistor to an on state comprises switching the transistor to an on state when a voltage drop across the resistor is sufficiently large.

13. A method comprising:
   at a source device associated with an inline power device, generating a current to supply power to a powered device;
   receiving the current from the source device at a resistance control circuit comprising a transistor having an emitter, a base and a collector, and a resistor coupled between the emitter and the collector of the transistor;
   at the resistance control circuit, passing the current through the resistor when the current is at a relatively low level to correct for leakage caused by the current flowing through a diode network before reaching the resistance control circuit, wherein the resistor maintains a sufficient resistance during an inline power device detection mode during which the inline power device is configured to detect a presence of the powered device by transmitting an electrical signal to determine whether a link between the inline power device and the powered device is active; and
   passing the current through the transistor to the powered device when the current is at a relatively high level.

14. The method of claim 13, further comprising protecting the resistance control circuit from electrical transient signals using a capacitor coupled between the emitter and the base of the transistor.

15. The method of claim 13, wherein passing the current through the transistor to the powered device comprises passing the current through the transistor when the transistor is configured to be in an on state to pass current to the powered device during an inline power device classification mode.

16. The method of claim 15, wherein passing the current when the transistor is configured to be in an on state comprises passing the current such that the current bypasses the resistor.

17. The method of claim 15, further comprising maintaining a voltage within a range expected by the powered device during the inline power device classification mode.

18. The method of claim 13, wherein passing the current through the transistor comprises switching the transistor to an on state when a voltage drop across the resistor is sufficiently large.

19. An apparatus comprising:
   means for receiving current from a source device associated with an inline power device;
   means for passing the current through a resistor when the current is at a relatively low value to correct for leakage caused by the current flowing through a diode network before passing through the resistor, the resistor having a value selected to maintain a resistance during an inline power device detection mode during which the inline power device is configured to detect a presence of a powered device by transmitting an electrical signal to determine whether a link between the inline power device and the powered device is active; and
   means for passing the current to the powered device when the current is at a relatively high level.

20. The apparatus of claim 19, wherein the means for passing comprises a transistor, wherein the transistor is configured to be in an off state to maintain the resistance within a resistance range suitable for the inline power device detection mode.

\* \* \* \* \*